US010710577B2

(12) United States Patent
Stefan et al.

(10) Patent No.: US 10,710,577 B2
(45) Date of Patent: Jul. 14, 2020

(54) METHOD FOR OPERATING A DRIVER ASSISTANCE SYSTEM TO PERFORM AN AUTONOMOUS PARKING MANEUVER

(71) Applicant: FORD GLOBAL TECHNOLOGIES, LLC, Dearborn, MI (US)

(72) Inventors: Frederic Stefan, Aachen (DE); Uwe Gussen, Hertgenwald (DE); Christoph Arndt, Reinland-Pfalz (DE); Rainer Busch, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 546 days.

(21) Appl. No.: 14/994,606

(22) Filed: Jan. 13, 2016

(65) Prior Publication Data
US 2016/0207528 A1    Jul. 21, 2016

(30) Foreign Application Priority Data
Jan. 15, 2015    (DE) .................. 10 2015 200 522

(51) Int. Cl.
*B60W 30/06*    (2006.01)
*B60W 10/04*    (2006.01)
(Continued)

(52) U.S. Cl.
CPC ............ *B60W 30/06* (2013.01); *B60W 10/04* (2013.01); *B60W 10/18* (2013.01); *B62D 15/027* (2013.01);
(Continued)

(58) Field of Classification Search
CPC .. B60W 10/04; B60W 10/18; B60W 2540/02; B60W 2540/04; B60W 2720/10;
(Continued)

(56) References Cited

U.S. PATENT DOCUMENTS 3,276,531 A * 10/1966 Hale ..................... A61G 5/061
                                                        180/6.5
4,387,325 A * 6/1983 Klimo ................... A61G 5/045
                                                        180/907
(Continued)

FOREIGN PATENT DOCUMENTS

CN        102085864 A       6/2011
DE     102005058499 A1      6/2007
(Continued)

OTHER PUBLICATIONS

Yakut, O., et al. "Dynamic risk modeling for safe car parking in climbing over urban curbs." Connected Vehicles and Expo (ICCVE), 2013 International Conference on. IEEE, 2013.*
(Continued)

*Primary Examiner* — Angelina Shudy
(74) *Attorney, Agent, or Firm* — Frank Lollo; Brooks Kushman PC

(57) ABSTRACT

A method of performing an autonomous parking maneuver of a vehicle begins with a human vehicle operator/driver issuing a command to a parking assistance system that the parking maneuver requires at least one vehicle wheel to encounter a vertical obstruction (such as a curb) undetected by a sensor providing information to the system. In reaction to the command, the parking assistance system enters an operating mode wherein a setpoint speed of the vehicle during the maneuver is decreased to operate the engine with a greater torque reserve so that it is better adapted to deal with the vertical obstruction. A brake system condition may also be changed when in the operating mode, such as decreasing a brake disk/pad distance. The command may be issued by a vehicle operator standing outside of the vehicle.

9 Claims, 3 Drawing Sheets

(51) Int. Cl.
    *B60W 10/18* (2012.01)
    *B62D 15/02* (2006.01)
(52) U.S. Cl.
    CPC ..... *B62D 15/0285* (2013.01); *B60W 2540/21* (2020.02); *B60W 2540/215* (2020.02); *B60W 2720/10* (2013.01)
(58) Field of Classification Search
    CPC .......... B60W 30/06; B60W 2540/215; B60W 2540/21; B62D 15/027; B62D 15/0285
    USPC .......................................................... 701/23
    See application file for complete search history.

(56) References Cited

U.S. PATENT DOCUMENTS

| | | | | |
|---|---|---|---|---|
| 4,811,966 A * | 3/1989 | Singleton | ................ | A61G 5/06 280/304.1 |
| 5,235,875 A * | 8/1993 | Yoshida | .............. | F16H 61/0213 477/129 |
| 5,248,007 A * | 9/1993 | Watkins | ................ | A61G 5/061 180/169 |
| 5,577,567 A * | 11/1996 | Johnson | ................ | A61G 5/061 180/9.23 |
| 6,484,829 B1 * | 11/2002 | Cox | ....................... | A61G 5/061 180/8.1 |
| 7,490,683 B2 * | 2/2009 | Schaffner | .............. | A61G 5/042 180/65.1 |
| 8,065,063 B2 | 11/2011 | Cho | | |
| 8,487,782 B2 * | 7/2013 | Pampus | .............. | B62D 15/027 340/435 |
| 8,577,538 B2 * | 11/2013 | Lenser | ................ | G05D 1/0274 701/2 |
| 8,825,292 B2 * | 9/2014 | Tseng | ................... | B60G 17/015 280/5.514 |
| 8,843,288 B1 * | 9/2014 | Rogalski | ............ | B60W 30/143 701/65 |
| 9,205,838 B2 * | 12/2015 | Moore | ................. | B60W 10/06 |
| 9,333,828 B2 * | 5/2016 | Tseng | ................. | B60G 17/0165 |
| 9,802,616 B2 * | 10/2017 | Horst | .................. | B60W 30/188 |
| 2002/0128762 A1 | 9/2002 | Noguchi et al. | | |
| 2003/0004617 A1 | 1/2003 | Kimura et al. | | |
| 2003/0038715 A1 * | 2/2003 | Engelman | ................ | B60Q 1/44 340/439 |
| 2003/0062228 A1 * | 4/2003 | Ichinose | ................ | B60T 7/042 188/72.3 |
| 2005/0055139 A1 | 3/2005 | Tanaka et al. | | |
| 2005/0071082 A1 * | 3/2005 | Ohmura | ................ | G01C 21/365 701/431 |
| 2005/0127631 A1 * | 6/2005 | Schaffner | .............. | A61G 5/042 280/124.1 |
| 2007/0156286 A1 * | 7/2007 | Yamauchi | ............ | G05D 1/0038 700/245 |
| 2009/0248270 A1 * | 10/2009 | Sekiguchi | ............ | B60W 10/06 701/96 |
| 2010/0017084 A1 * | 1/2010 | Riegel | ..................... | B60Q 9/004 701/70 |
| 2010/0113220 A1 * | 5/2010 | Mair | ..................... | B60W 10/06 477/120 |
| 2011/0068953 A1 | 3/2011 | Toledo et al. | | |
| 2011/0121994 A1 * | 5/2011 | Pampus | ............... | B62D 15/027 340/932.2 |
| 2013/0116879 A1 * | 5/2013 | Huger | ................. | B62D 15/0285 701/23 |
| 2014/0000990 A1 * | 1/2014 | Shiraki | .................... | F16D 65/66 188/71.8 |
| 2014/0121883 A1 * | 5/2014 | Shen | .................. | B62D 15/0285 701/28 |
| 2014/0121930 A1 * | 5/2014 | Allexi | ................... | B60W 50/10 701/70 |
| 2014/0142827 A1 * | 5/2014 | Shimizu | .................... | B60T 7/22 701/70 |
| 2014/0195114 A1 * | 7/2014 | Tseng | .................... | B60G 17/015 701/37 |
| 2014/0222252 A1 * | 8/2014 | Matters | ................ | B62D 15/027 701/2 |
| 2014/0229049 A1 * | 8/2014 | Horst | .................. | B60W 30/188 701/22 |
| 2014/0350836 A1 * | 11/2014 | Stettner | ................. | G01S 17/023 701/301 |
| 2014/0371985 A1 * | 12/2014 | Tseng | .................... | B60G 17/015 701/38 |
| 2015/0006013 A1 | 1/2015 | Wimmer et al. | | |
| 2015/0217767 A1 * | 8/2015 | Kelly | ..................... | B60K 28/16 701/93 |
| 2015/0344028 A1 * | 12/2015 | Gieseke | ................ | B60W 30/00 701/1 |
| 2016/0023658 A1 * | 1/2016 | Kelly | .................. | B60W 50/085 701/94 |
| 2016/0068158 A1 * | 3/2016 | Elwart | .................. | B60W 30/06 701/41 |
| 2016/0217689 A1 * | 7/2016 | Young | .................. | G08G 1/0965 |
| 2017/0122430 A1 * | 5/2017 | Jerger | ................. | F16H 61/0213 |
| 2017/0129538 A1 * | 5/2017 | Stefan | ................ | B62D 15/0285 |
| 2017/0139415 A1 * | 5/2017 | Stefan | .................. | G05D 1/0088 |
| 2017/0166218 A1 * | 6/2017 | Hoare | ................. | B60W 40/105 |
| 2017/0228605 A1 * | 8/2017 | Konishi | ............. | G06K 9/00812 |
| 2017/0254895 A1 * | 9/2017 | Tong | .......................... | G01S 7/41 |
| 2017/0261994 A1 * | 9/2017 | Simmons | ............. | B62D 15/027 |
| 2017/0356994 A1 * | 12/2017 | Wodrich | ............... | G01S 13/867 |

FOREIGN PATENT DOCUMENTS

| | | | |
|---|---|---|---|
| DE | 102010025552 A1 | 12/2011 | |
| DE | 102012001312 A1 | 8/2012 | |
| DE | 102013015348 A1 | 4/2014 | |
| DE | 102014203138 A1 | 10/2015 | |
| EP | 2327574 A1 * | 6/2011 | .......... B60W 30/188 |

OTHER PUBLICATIONS

German Patent and Trademark Office, Examination Report for the corresponding German Patent Application No. 10 2015 200 522.4 dated Oct. 30, 2015.

Chinese Office Action for Chinese Application No. 201610009105.2 dated Jun. 4, 2019.

\* cited by examiner

Fig. 2A

| Voice command (driver) | Messages from voice recognition module | Operating state |
|---|---|---|
| Activate parking assistance device  21 | | Parking assistance activated  51 |
| Park  22 | | |
| Parallel mode  23 | "Please select parking mode" | |
| Perpendicular mode  24 | | |
| Continue parking space detection  25 | "Start parking space detection" "Abort parking space detection" "Parking space found" | Parking space detection  52 |
| | "Select mode" | |
| Special operating mode  26 | | Optimization strategy  53 |
| Curb / 2 wheels  27 | Perpendicular with obstacle delimitation  32 | |
| Curb / 4 wheels  28 | Pothole / Bump in road  33 | |
| Slope + / −  29 | Reduced parking space dimensions due to objects that are unusual / not detectable by the sensor  34 | Mode [...] selected  54 |
| Off-road  30 | | |
| Normal  31 | | |
| Park  35 | "At the start of the maneuver, actuate the N position + brake pedal" | Maneuver at low speed  55 |

Fig. 2B

| Voice command (driver) | Messages from voice recognition module | Operating state |
|---|---|---|
| 36 Interrupt maneuver | "Start parking maneuver" | |
| | "Parking maneuver interrupted, to resume…" | |
| 37 Resume maneuver | | |
| | "Resume parking maneuver" | |
| 38 Abort | | |
| | "Parking maneuver aborted Return in 5, 4, 3,…" | |
| 39 Increase speed | | |
| | "Speed is [low/moderate/high]" | |
| 40 Reduce speed | | 56 Termination of parking maneuver |
| 41 Steer wheels toward the curb | "Wheels steered" | |
| 42 Deactivate the parking assistance device | "Parking assistance deactivated, return in 5, 4, 3,…" | 57 Parking assistance deactivated |

METHOD FOR OPERATING A DRIVER ASSISTANCE SYSTEM TO PERFORM AN AUTONOMOUS PARKING MANEUVER

CROSS-REFERENCE TO RELATED APPLICATIONS

This application claims foreign priority benefits under 35 U.S.C. § 119(a)-(d) to DE 10 2015 200 522.4 filed Jan. 15, 2015, which is hereby incorporated by reference in its entirety.

TECHNICAL FIELD

This disclosure relates to a method for supporting a maneuvering procedure of a motor vehicle and to a driver assistance system.

BACKGROUND

The future generation of driver assistance systems, which are expected to come onto the automotive vehicle market within the next few years, is capable of taking over the lateral and longitudinal control of the motor vehicle in order to autonomously carry out the entire parking maneuver. The function of such parking assistance systems is based on the use of a group of sensors for monitoring the surroundings as well as on decision logic for the best possible execution of the parking procedure.

The control logic of such parking assistance systems typically includes a plurality of operating modes and phases, for example, an activation phase (in which the driver activates the system by signaling the desire to park and, optionally, specifies the shape of the parking space or perpendicular or parallel parking), the search for available parking spaces, the actual maneuvering phase, optionally interrupting or aborting the parking procedure, certain measures after the parking maneuver has ended (e.g., actuating the parking brake or shutting off the engine) and, optionally, a mode for exiting the parking space, in which the vehicle, for example, is moved out of a tight parking space or the driver is enabled to easily exit a parking space.

With respect to the prior art, reference is made only to DE 10 2005 058 499 A1, by way of example.

SUMMARY

In a method for supporting a maneuvering procedure of a motor vehicle, wherein the motor vehicle comprises a driver assistance system, the maneuvering procedure is at least partially autonomously controlled by the driver assistance system with consideration for the surroundings of the motor vehicle and on the basis of specified control parameters. In reaction to a driver input, an alternative operating mode of the motor vehicle is activated, wherein this alternative operating mode includes a change of at least one of the control parameters.

The present invention is based, in particular, on the concept of activating a special operating mode of a driver assistance system on the basis of driver inputs, in particular, voice commands. In this case, the activation of a special operating mode according to the invention does not result in direct control of the motor-vehicle movement, but rather the driver is provided with an additional option for conveniently monitoring and influencing a maneuvering procedure such as, for example, a parking maneuver.

According to this disclosure, the situation is taken into account in this case, in which, for example, maintaining a specified setpoint speed value while driving onto a curb edge requires a different type of actuation of the engine and the brakes than is the case, for example, when maintaining a specified setpoint speed value on a flat roadway. However, since a curb edge cannot always be reliably detected by a parking sensor, for example, it is provided according to the invention that the driver, for example, is enabled to activate a corresponding special "parking on a curb edge" operating mode.

As disclosed herein, the driver of a motor vehicle is enabled to easily affect or change the operation of a parking assistance system and to easily activate or deactivate optional functionalities, for example, during an autonomously executed parking maneuver, wherein this influencing by the driver can take place from either within the motor vehicle or outside of the motor vehicle.

By means of the activation of special operating modes of the motor vehicle according to this disclosure, in the end result, the capability of a driver assistance system, which is designed, for example, to autonomously carry out a parking procedure, can be improved in terms of the control of the applicable maneuvering procedure. In addition, by means of the disclosed method, the capability of the driver assistance system can be improved in terms of driving comfort, the NVH properties, the feeling of driving, as well as the responsiveness of the control of the particular maneuvering procedure.

According to one embodiment, the change of at least one of the control parameters carried out in the alternative operating mode includes one or more of the following measures:
 specifying a changed setpoint speed value for movement of the motor vehicle during the maneuvering procedure;
 changing the brake condition (such as spacing between a brake rotor and pad of one or more of the wheel brakes);
 using a changed control algorithm during the maneuvering procedure.

A special operating mode, such as, for example, "parking on a curb edge" can include, for example, that a lower setpoint speed value for the motor vehicle movement is specified for the drive of the motor vehicle, in order to operate the engine with a greater torque reserve. In addition, a rapid reaction or a more rapid response of the brakes can be made possible by adjusting or moving the brake pads or brake disks closer to one another.

Furthermore, the activation of a special operating mode according to this disclosure can include, for example, the use of alternative parameter values, the use of an alternative control algorithm or the use of an alternative operating principle, wherein this use can either apply for the duration of the particular driving or parking maneuver (for example, when the driver has activated the particular operating mode before the applicable maneuver) or can be activated only after a related command is spoken by the driver (when the maneuver is already underway).

According to one embodiment, the driver input for activating a special operating mode is implemented by voice input. The activation of special operating modes on the basis of voice commands or acoustically perceptible driver inputs, according to the invention, is particularly advantageous in that, in this manner, the driver is distracted to a substantially lesser extent. The driver, who must keep an eye on the movement of the motor vehicle and its surroundings at all times, is always aware that he can influence the applicable current driving maneuver using voice commands.

The voice control by the driver does not require that the entire existing control logic be replaced or swapped out, but rather can be implemented, via a suitable interface, as an add-on to a parking assistance device which is already present.

The voice control can be carried out both when the driver is located on-board the motor vehicle when the driver is located outside the motor vehicle, for example, during a parking maneuver. According to this disclosure, the driver is incorporated into the control of the particular maneuvering procedure, wherein he/she is provided with the option, in a particularly intuitive manner, of additionally affecting or altering the operation of the driver assistance device.

According to one embodiment, the maneuvering procedure comprises a parking maneuver.

According to one embodiment, the driver input signals the intention to drive the motor vehicle at least partially onto a curb.

According to one embodiment, various alternative operating modes of the motor vehicle are activated depending on whether the driver input signals the intention to drive the motor vehicle onto a curb with two wheels or with four wheels.

According to one embodiment, the driver input signals the existence of an obstacle or obstruction for the maneuvering procedure.

The invention further relates to a driver assistance system for supporting a maneuvering procedure of a motor vehicle, wherein the maneuvering procedure can be at least partially autonomously controlled by the driver assistance system with consideration for the surroundings of the motor vehicle and on the basis of specified control parameters, and wherein the driver assistance system is designed for carrying out a method having the above-described features.

The invention is explained in greater detail in the following on the basis of exemplary embodiments and with reference to the attached drawings.

In the drawings:

BRIEF DESCRIPTION OF THE DRAWINGS

FIGS. 2A-B show schematic illustrations for explaining the possible activation of additional operating modes on the basis of voice commands from a driver, according to one embodiment of the invention.

DETAILED DESCRIPTION

Figure 1:
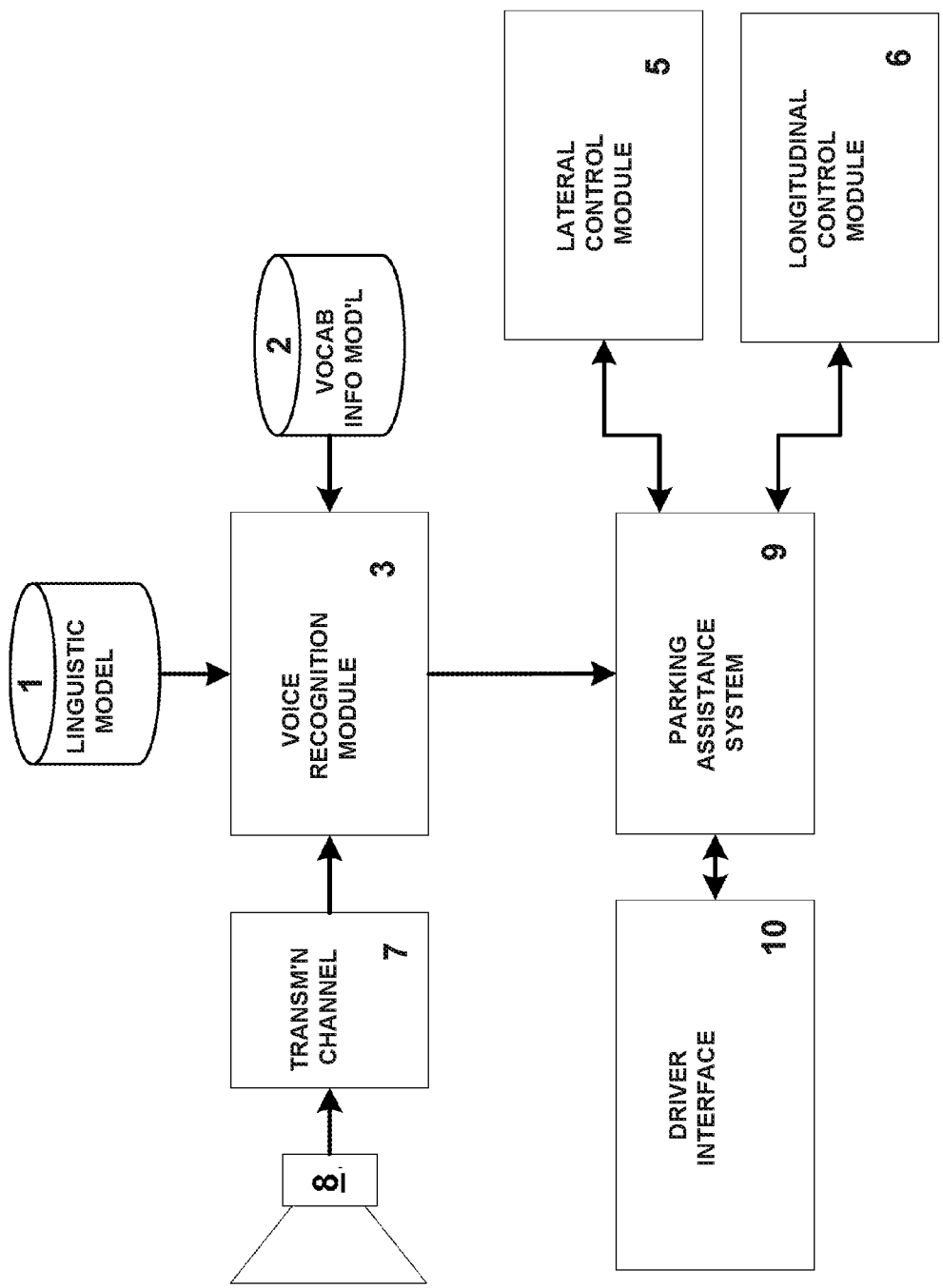
FIG. 1 shows a schematic illustration for explaining modules of a driver assistance system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to FIG. 1, voice commands issued by a driver 4 enter, via a microphone 8, a transmission channel 7 for the applicable audio signals. These are fed to a voice recognition module 3 for interpretation of the voice commands from the driver, wherein the voice recognition module 3 translates the commands spoken by the driver 4 into instructions for the driver assistance system in the form of a parking assistance device 9.

The voice recognition module 3 (in a manner well known in the art) carries out the interpretation of the voice commands from the driver 4 on the basis of a statistical linguistic model provided by a module 1 and on the basis of the vocabulary or grammar information provided by a module 2. According to FIG. 1, the parking assistance device 9 exchanges data with a lateral control module 5 (controlling steering the motor vehicle) and a longitudinal control module 6 (controlling the brakes, gas pedal, and transmission of the motor vehicle). In addition, reference number 10 labels a conventional, non-verbal, interface for enabling driver inputs (in particular for activating an autonomous parking maneuver).

In addition, possible functionalities of the voice recognition module 3 in FIG. 1 (center column in FIGS. 2A-B) are each explained in combination with associated voice commands from the driver (left column in FIGS. 2A-B) and the particular operating state of the driver assistance device 9 (right column in FIGS. 2A-B) with reference to the schematic illustration in FIGS. 2A-B.

According to FIGS. 2A-B, after activating the parking assistance device 9 (by issuing voice command 21) and commanding the start of the standard parking mode (voice command 22), the driver can issue further commands, in particular, regarding the type and manner of the parking procedure to be carried out ("parallel type" according to command 23, "perpendicular type" according to command 24) or also a command to start the parking space detection 25.

In addition, the driver can issue various commands 26-34 for selecting a special operating mode that is adapted for physical conditions of the parking surface/environment that are identified by the driver but that cannot be (or are unlikely to be) detected by the vehicle sensors that supply environmental information to the parking assistance system. Such a special operating mode may, for example, be adapted for parking with two or four wheels of the vehicle on a curb (27 and 28 respectively), or for accounting for a pothole or a road bump (33) in the parking environment.

As a result of the selection of a special operating mode, for example, a changed setpoint speed value for the drive of the motor vehicle during the maneuvering procedure can be specified, the brake condition (for example, disk/pad spacing) can be changed, and/or a changed control algorithm can be used during the maneuvering procedure.

The driver can, in particular, specify other setpoint speed values (see FIG. 2A, voice commands 39 and 40) for carrying out the parking maneuver.

In embodiments of the invention, the driver can signal, for example, the presence of a curb edge via voice inputs in order to adapt the control of the maneuvering procedure or the parking maneuver accordingly (for example by selecting a certain motion path, a speed suitable for carrying out the maneuver, or a torque suitable for carrying out the maneuver). In this case, the driver can also optionally indicate the approximate point in time of the anticipated contact with the curb edge in order to optimize the control strategy accordingly.

In addition, the driver can also signal certain physical characteristics, conditions, or particularities of the parking environment, which are unlikely to be detected by the available sensors, such as, for example, the presence of a lowered sidewalk, a particularly uneven roadway, the existence of potholes, etc., whereby the control strategy can likewise be adapted during the driving maneuver (for example, by specifying a lower setpoint speed value). Optionally, the driver can also issue the instruction to orient the wheels toward the curb edge after the parking maneuver has been completed (FIG. 2, ref. no. 41), which can be desirable, for example, when the parking space is located on a slope. In further embodiments, the driver can also activate an automatic payment procedure for the parking procedure in a voice-supported manner, provided the motor vehicle is equipped accordingly.

In addition, while looking for a suitable parking space, the driver can also use a suitable voice command to activate the tail lamps and signal to following vehicles that a parking maneuver is imminent. Furthermore, the driver can also query certain information regarding the selected parking space (for example, parking restrictions, distance from the destination or the home address) in a voice-supported manner.

The reference numbers 35 to 42 label the further usual input commands to initiate, interrupt, or abort the maneuver of the parking assistance device 9. In addition, the particular corresponding operating state of the parking assistance device 9 is labeled with 51 to 57 in FIGS. 2A-B.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of operating a parking assistance system to perform an autonomous parking maneuver of a vehicle, comprising:
   activating the parking assistance system in response to receiving an associated activation voice command;
   selecting one of a plurality of special operating modes in response to receiving an operating mode voice command, the plurality of special operating modes including at least one operating mode associated with parking the vehicle with at least one wheel of the vehicle on a curb;
   selecting a parking maneuver setpoint speed of the vehicle for use during the parking maneuver in response to the selected special operating mode, wherein the setpoint speed is selected in response to receiving a setpoint speed voice command; and
   communicating the selected setpoint speed to a vehicle longitudinal control module to control the vehicle speed to the selected setpoint speed during the autonomous parking maneuver.

2. The method of claim 1 further comprising, in reaction to the selected special operating mode, exchanging data with the longitudinal control module to control a vehicle brake.

3. The method of claim 2 wherein the longitudinal control module reduces a distance between a brake rotor and a brake pad prior to brake application.

4. A method of performing a vehicle autonomous parking maneuver, comprising:
   receiving a voice command via a parking assistance system indicating that the parking maneuver requires at least one vehicle wheel to encounter a vertical obstruction undetected by a vehicle sensor;
   in reaction to the voice command, the parking assistance system entering an operating mode wherein a setpoint speed of the vehicle during the maneuver is specified by the voice command and is decreased;
   communicating the decreased setpoint speed to a vehicle longitudinal control module; and
   controlling the vehicle speed to the decreased setpoint speed during the maneuver.

5. The method of claim 4 wherein the vertical obstruction is a curb and the parking maneuver requires the at least one wheel of the vehicle to mount the curb.

6. The method of claim 4 wherein the operating mode further comprises a change in a condition of a vehicle brake.

7. The method of claim 6 wherein the condition is a distance between a brake rotor and a brake pad prior to brake application.

8. The method of claim 4, wherein the voice command is processed by a voice recognition module.

9. The method of claim 4, wherein the voice command is received from outside of the vehicle.

* * * * *